US008838390B1

(12) United States Patent
Selman et al.

(10) Patent No.: US 8,838,390 B1
(45) Date of Patent: *Sep. 16, 2014

(54) SYSTEM FOR GAS DETECTION, WELL DATA COLLECTION, AND REAL TIME STREAMING OF WELL LOGGING DATA

(75) Inventors: Thomas H. Selman, Midland, TX (US); Matthew J. Jennings, Midland, TX (US)

(73) Assignee: Selman and Associates, Ltd., Midland, TX (US)

(*) Notice: Subject to any disclaimer, the term of this patent is extended or adjusted under 35 U.S.C. 154(b) by 131 days.

This patent is subject to a terminal disclaimer.

(21) Appl. No.: 13/029,666

(22) Filed: Feb. 17, 2011

(51) Int. Cl.
| E21B 44/00 | (2006.01) |
| E21B 49/00 | (2006.01) |
| E21B 49/08 | (2006.01) |
| G06F 17/00 | (2006.01) |
| E21B 47/00 | (2012.01) |
| G06F 17/40 | (2006.01) |
| H04L 29/08 | (2006.01) |

(52) U.S. Cl.
CPC .............. *E21B 44/00* (2013.01); *E21B 49/005* (2013.01); *E21B 49/00* (2013.01); *E21B 49/08* (2013.01); *G06F 17/00* (2013.01); *E21B 47/00* (2013.01); *G06F 17/40* (2013.01); *H04L 67/12* (2013.01)
USPC ........ 702/9; 702/6; 702/11; 702/13; 702/188; 367/25; 166/264; 73/152.02; 73/152.04; 175/40

(58) Field of Classification Search
CPC ......... E21B 44/00; E21B 47/00; E21B 49/00; E21B 49/005; E21B 49/08; G06F 17/00; G06F 17/40; H04L 67/12
USPC ................... 702/6, 8, 9, 11, 13, 188; 175/40; 73/152.02, 152.04; 367/25; 166/264
See application file for complete search history.

(56) References Cited

U.S. PATENT DOCUMENTS

| 5,237,539 | A | 8/1993 | Selman | |
| 6,101,445 | A * | 8/2000 | Alvarado et al. | 702/9 |
| 6,290,000 | B1 * | 9/2001 | Zamfes | 175/50 |
| 6,519,568 | B1 * | 2/2003 | Harvey et al. | 705/1.1 |
| 6,751,555 | B2 * | 6/2004 | Poedjono | 702/6 |
| 6,760,665 | B1 * | 7/2004 | Francis | 702/6 |
| 6,826,492 | B2 * | 11/2004 | Newman | 702/45 |
| 8,705,318 | B2 * | 4/2014 | Zheng et al. | 367/81 |
| 2002/0169645 | A1 * | 11/2002 | Aronstam et al. | 705/7 |
| 2006/0239118 | A1 * | 10/2006 | Guidry et al. | 367/68 |
| 2008/0208475 | A1 * | 8/2008 | Karr et al. | 702/6 |
| 2009/0132458 | A1 * | 5/2009 | Edwards et al. | 706/50 |
| 2010/0235101 | A1 * | 9/2010 | Aamodt et al. | 702/9 |
| 2011/0071810 | A1 * | 3/2011 | Yeriazarian et al. | 703/10 |

* cited by examiner

*Primary Examiner* — Andrew Schechter
*Assistant Examiner* — John Kuan
(74) *Attorney, Agent, or Firm* — Buskop Law Group, PC; Wendy Buskop

(57) ABSTRACT

A system for creating a log during gas detection and monitoring is disclosed herein. The system can include a gas detection and well logging device for sensing and transmitting data, which can include a processor in communication with a monitoring device. The monitoring device can monitor, acquire, and transmit data associated with a drilling operation. The processor can receive the data, calibrate the data, and log the data into files. The processor can capture sensed data based on a time event and a depth event. The processor can scale the data and form a geological-hydrocarbon log for transmission. A client device can be in communication with the gas detection and well logging device, and can have computer instructions for querying the geological hydrocarbon log, the data, and the files to obtain real time streaming data for instant display.

8 Claims, 10 Drawing Sheets

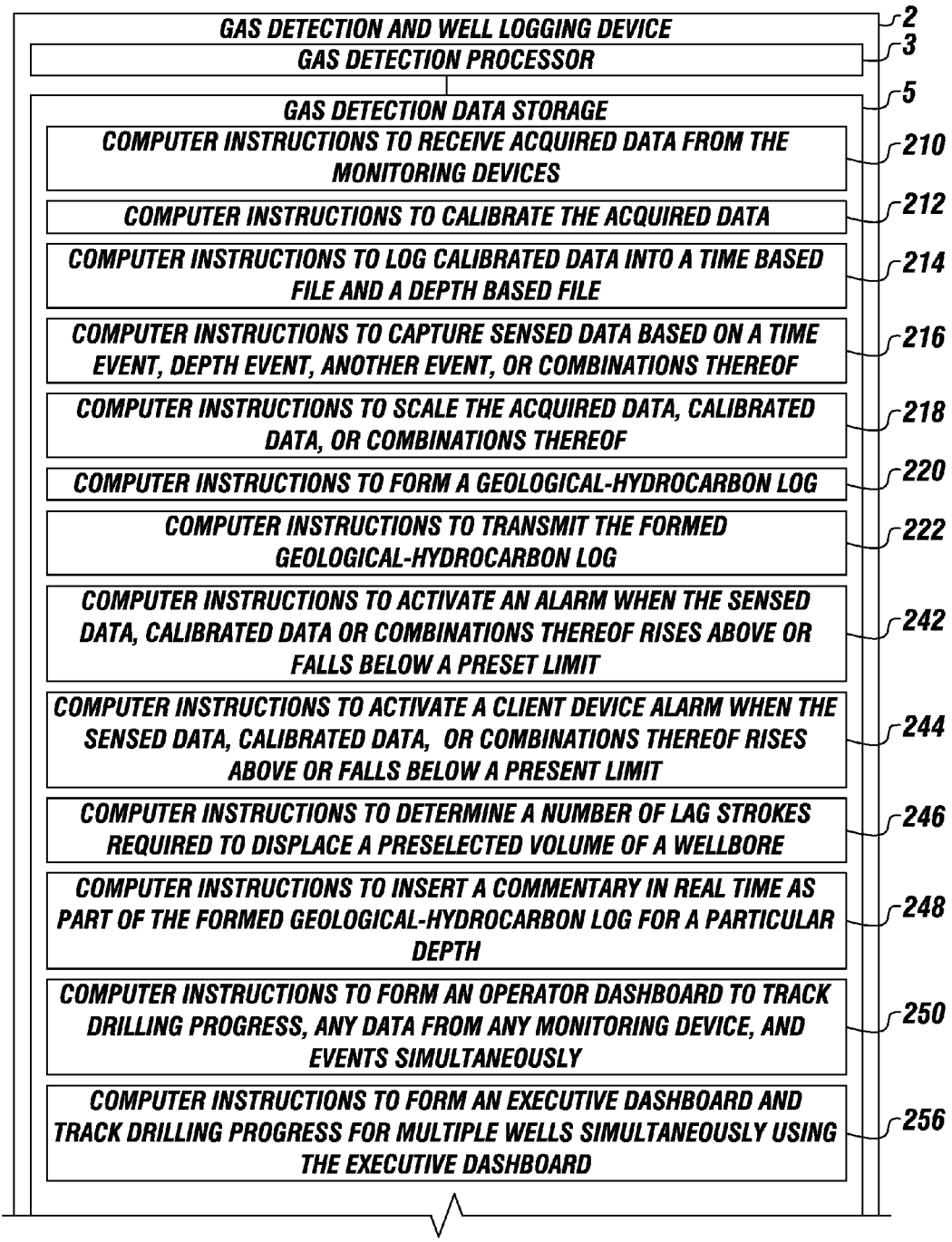

FIGURE 8

5910 - UNIVERSITY 4-29C #1
LAST UPDATED: 01/19/2011 4:52:31 PM
OFF BOTTOM

| HOLE DEPTH | BIT DEPTH | LAG DEPTH | TOTAL GAS | METHANE |
|---|---|---|---|---|
| 7906.73 | 7905.51 | 7878.00 | 28.15 | 7906.73 |
| FT | FT | FT | UNITS | UNITS |
| ETHANE | PROPANE | ISO-BUTANE | NOR-BUTANE | DR |
| 83.26 | 118.33 | 5.43 | 54.63 | 1.05 |
| UNITS | UNITS | UNITS | UNITS | MIN/FT |
| ROP | WOB | HOOK LOAD | BLOCK POS | PUMP PRES |
| 57.38 | 0.07 | 162.55 | 21.23 | 1009.30 |
| FT/HR | klbs | klbs | FT | PSI |
| PUMP 1 | PUMP 2 | PUMP 3 | LAG STKS | TORQUE |
| 0 | 65 | 0 | 2737 | 0.00 |
| STK/MIN | STK/MIN | STK/MIN | - | KFT LBS |
| ROTARY | CC UNITS | TC UNITS | CARRIER PRES | SEL TOTAL STK |
| 65 | 28.15 | -22.86 | 6.13 | 498785.95 |
| RPM | UNITS | UNITS | PSI | STK |
| SEL LAG STK | TOTAL GAS | ROP-AVG | CASNG PRES | METHANE-RT |
| 496049.34 | 28.15 | 0.00 | 0.00 | 10 |
| STK | UNITS | FT/HR | PSI | UNITS |
| ETHANE-RT | PROPANE-RT | ISO-BUTANE-RT | NOR-BUTANE-RT | VENDOR1 |
| 4 | 6 | 0 | 2 | 0 |
| UNITS | UNITS | UNITS | UNITS | - |
| SEL HOLE DEPTH | IR TG UNITS | IR CO2 % | TG TEMPERATURE | GC TEMPERATURE |
| 7906.70 | -62445.63 | -112.75 | 0.00 | 0.00 |
| FT | UNITS | % | DEG F | DEG F |
| TG FLOW RATE | GC FLOW RATE | FUEL LEVEL | | |
| 1.90 | 1.90 | 0.00 | | |
| SCFH | SCFH | GAL | | |

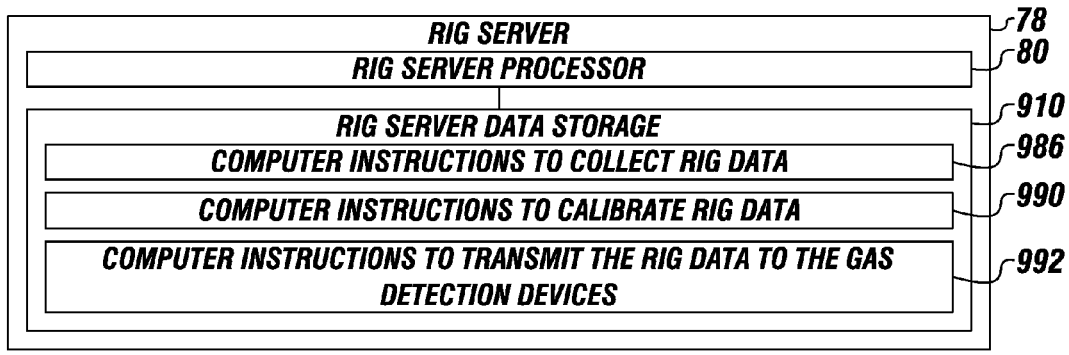
FIGURE 9
FIGURE 10
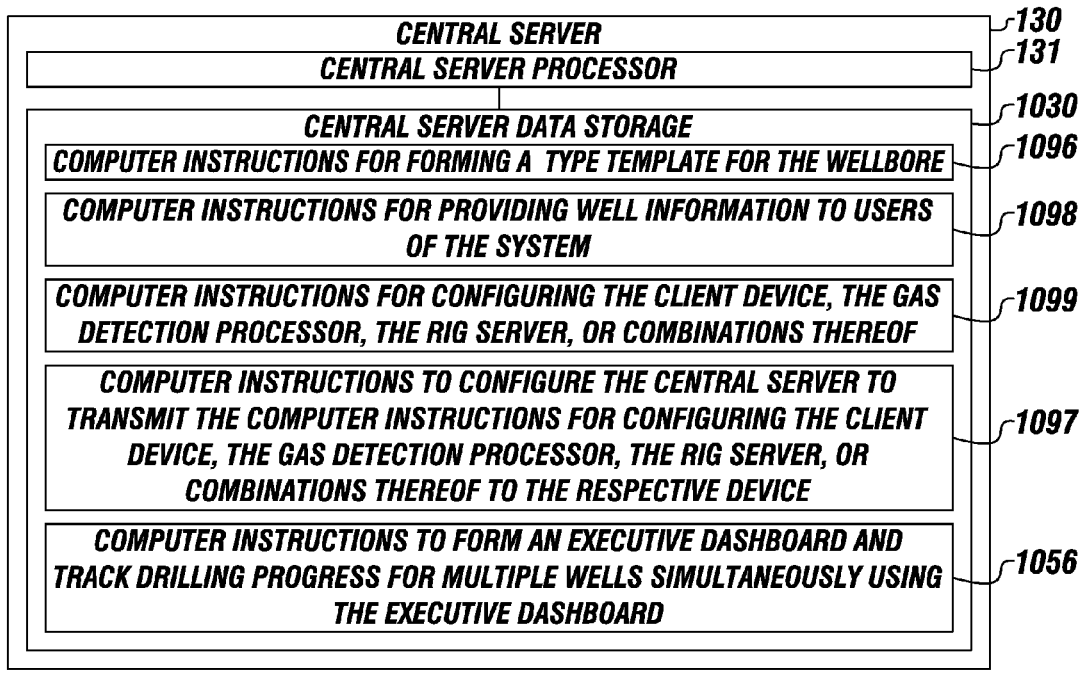

SYSTEM FOR GAS DETECTION, WELL DATA COLLECTION, AND REAL TIME STREAMING OF WELL LOGGING DATA

FIELD

The present embodiments generally relate to capturing surface data pertinent to creating surface logs during the drilling of a well, during work over of a well, after drilling a well, and combinations thereof, and to presenting the captured surface data by streaming the captured surface data and calibrated data in real-time to a user.

BACKGROUND

A need exists for real-time streaming of data from a rig to avoid explosions, fires, and blow outs on a rig, such as when a driller approaches a high value natural gas or oil reserve.

A need exists for real-time streaming of data from a rig enabling management personnel to view the data from the rig from a remote location, such as from a warm remote location 2,000 miles away from a cold harsh, brutal, arctic air drilling site.

A need exists for real-time streaming of data enabling management and rig operators to simultaneously view performance of the drilling operations of multiple rigs to avoid environmental spills and protect the environment by monitoring the wells 24 hours a day, 7 days a week.

A need exists for real-time streaming of data on surface conditions near a well, allowing for quick action to instill protective measures to prevent death on a rig, which can result in a shut down of an entire company, and can dramatically affect the morale of workers on related rigs owned by the same company.

A need exists for real-time streaming of data during horizontal and directional drilling to prevent intersection of boreholes during multi-hole drilling at a single site.

A need exists for real-time streaming of data to correctly mix drilling muds relative to operations during drilling.

A further need exists for real-time streaming of data for economic evaluations of a formation.

The present embodiments meet these needs.

BRIEF DESCRIPTION OF THE DRAWINGS

The detailed description will be better understood in conjunction with the accompanying drawings as follows:

FIGS. 2A-2B depict a schematic of a gas detection and well logging device according to one or more embodiments.

FIG. 8 depicts a client device displaying live streaming data according to one or more embodiments.

FIG. 9 depicts an embodiment of a rig server according to one or more embodiments.

FIG. 10 depicts a central server according to one or more embodiments.

Figure 1:
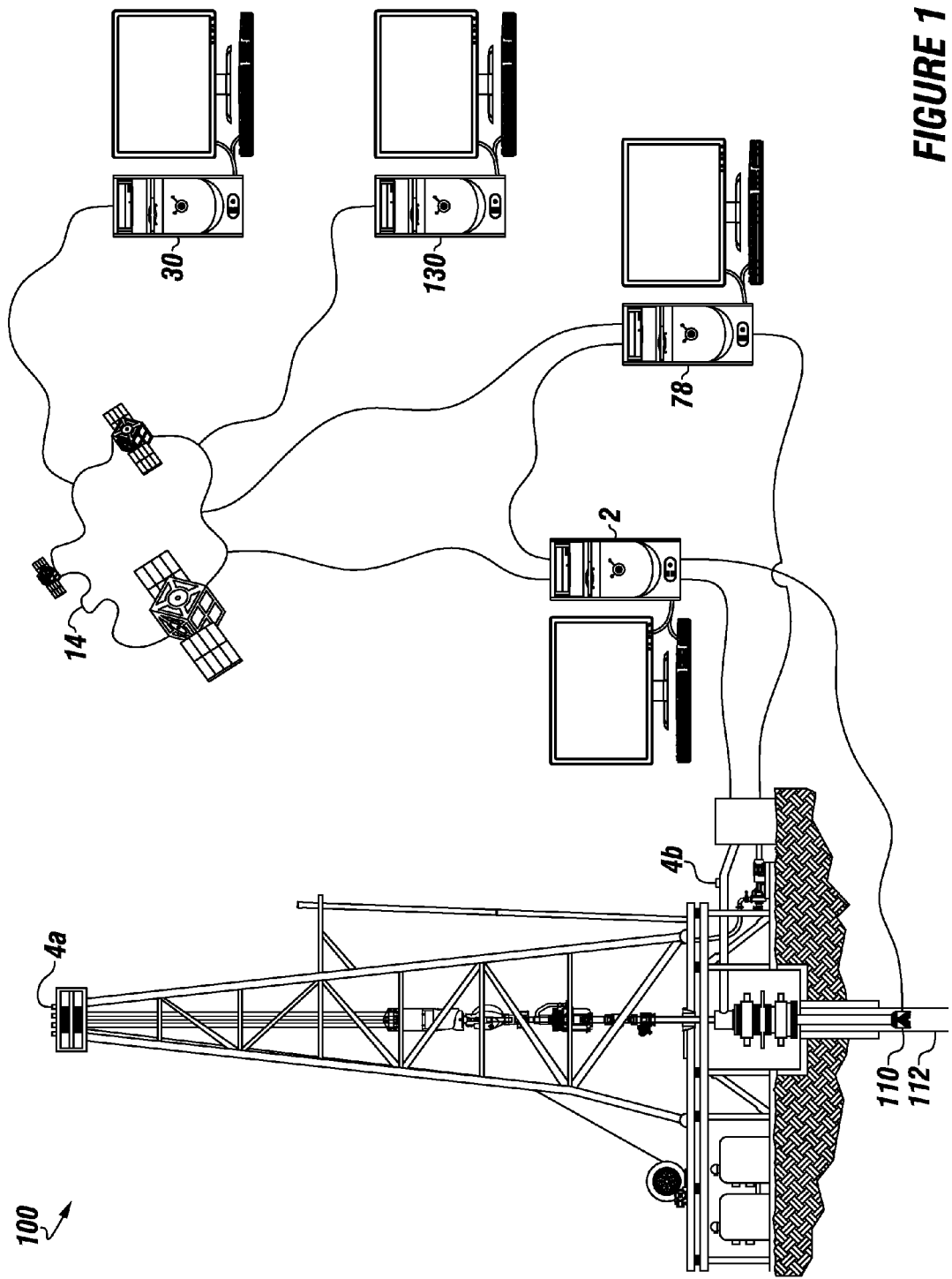
FIG. 1 depicts a schematic showing an embodiment of a system for creating a log during gas detection and monitoring according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The system can produce a geological-hydrocarbon log, and can monitor for certain desired events during drilling operations using real-time streaming of data.

The monitoring can occur at the drilling location, a remote location, or both. As such, the system can allow for simultaneous localized monitoring and remote monitoring. The remote monitoring and localized monitoring can be performed over a network using at least one client device, such as a laptop, cell phone, a smart phone, a tablet, a netbook, the like, a desktop computer, or other networkable device capable of data processing and storage.

In one or more embodiments, the system can include one or more gas detection and well logging devices. The gas detection and well logging devices can be used on a rig. In one or more embodiments, a plurality of gas detection and well logging devices can be used simultaneously on the rig.

One or more of the gas detection and well logging devices can be in communication with or otherwise can include one or more monitoring devices. The monitoring devices can be sensors or other data acquiring devices. The monitoring devices can be associated with drilling equipment, a wellbore being drilled, a mud pit, or combinations thereof. For example, one or more monitoring devices can be connected to one or more pieces of drilling equipment. The monitoring devices can monitor, acquire, and transmit data associated with the connected drilling equipment.

In one or more embodiments, the monitoring devices can be configured to monitor and acquire data related to gas detection, fluid status, bit status, emissions from the well, and any other wellbore data. Illustrative monitoring devices can include mud pit volume totalizers, mud pit monitors, drill switches, gas sensors, depth sensors, on-off bottom switches, flame ionization detectors, catalytic combustion detectors, thermal conductivity detectors, infrared gas detectors, other gas detection devices, other gas measuring devices, weight on bit transducers, drilling rig servers, chromatographs, pump stroke counters, or combinations thereof.

The monitoring devices can acquire one or more portions of data associated with one or more properties of a drilling operation. The properties of the drilling operation can be associated with a wellbore, a mud pit, drilling equipment, or combinations thereof. Illustrative data that can be monitored by the monitoring devices can include depth recorder data, steering tool data, a content of the gas, a depth of the drill bit, directional drilling data, rotary table data, such as revolutions per minute, other wellbore data, pump pressures, pump stroke rates, pump stroke count totals, casing pressures, gamma ray readings, resistivity readings, porosity readings, caliper readings, bottom hole temperatures, reservoir survey data, inclinations, elevations, type of rock, other drilling operation data, or combinations thereof. The data can be acquired and transmitted in real-time. The data can be transmitted as signals from the monitoring devices, such as by using commercially available telemetry.

The monitoring devices can be in communication with one or more gas detection processors. The gas detection processors can be in communication with a network. The network can be a fiber optic network, a wired network, such as a Cat5e network, the Internet, a wireless local area network (WLAN), such as WI-FI™, other wireless networks, other wired networks, a satellite network, a cellular network, other communication networks, or combinations thereof. One or more of the gas detection processors can also act as the processor for logging software programs. As such, one or more of the gas detection processors can support multiple applications simultaneously.

One or more of the gas detection processors can be in communication with the one or more monitoring devices, a rig server, a central server, a client device, or combinations thereof. The gas detection processor can receive the acquired data from the monitoring devices, and can use computer instructions to record the acquired data, to record data from the rig server, or both. The acquired data can be transmitted to the gas detection processor as signals. The gas detection processor can be configured to interpret the signals and extract the acquired data.

One or more gas detection data storages, which can be in communication with the one or more gas detection processors, can include gas detection computer instructions to configure the gas detection processor to calibrate the acquired data. The calibration can be performed using equations stored in the gas detection data storage, or by using known standard gas values and comparing these known standard gas values to the acquired data. For example, the calibration can include comparing the response of a sensor to one or more known parameters, and deriving a correlation between the response of the sensor and the known parameters. For example, a gas detection sensor can produce a 100 mV response when exposed to a 1 percent volume of methane, and a correlation between the produced 100 mV response can be derived using techniques known to one skilled in the art.

One or more of the gas detection processors can be configured to receive the acquired data from the monitoring devices, calibrate the acquired data, log the calibrated data into a time based file and a depth based file, capture the acquired data based on a time event, depth event, another event, or combinations thereof scale the acquired data, calibrated data, or combinations thereof form a geological-hydrocarbon log, transmit the formed geological-hydrocarbon log to one or more client devices or other communication devices in communication with the gas detection processor, transmit the acquired data, calibrated data, or combinations thereof to one or more client devices or other communication devices in communication with the gas detection processor, or combinations thereof.

One or more of the gas detection data storages can have stored thereon computer instructions configured to operatively instruct one or more of the gas detection processors. The gas detection data storage can be one or more flash drives, internal hard drives, external hard drives, virtual hard drives, floppy disk drives, optical disk drives, other computer readable medium storage devices, or combinations thereof. In one or more embodiments, the gas detection data storage can be configured in a triple redundant architecture. For example, the triple redundant architecture can be a flash drive, a hard drive, and a portable hard drive. In one or more embodiments, the triple redundant architecture can include a hard drive, a CD writer, and a printer. The system can also have redundant gas detection hardware and computer hardware.

One or more of the gas detection data storages can have gas detection computer instructions for instructing one or more of the gas detection processors to compare the acquired data to preset data. The preset data can be stored in a database on one or more of the gas detection data storages or another computer readable medium in communication with the gas detection processor. Accordingly, when the gas detection processor receives the acquired data from one or more of the monitoring devices, the gas detection processor can use these computer instructions to determine if the acquired data is within a desired range, is representative of a problematic condition, or combinations thereof.

One or more of the gas detection data storages can include gas detection computer instructions to instruct one or more of the gas detection processors to transmit the acquired data to one or more users. For example, one or more of the gas detection data storages can have computer instructions to enable one or more of the gas detection processors to communicate with one or more users via a smart phone, laptop, personal computer, other communication device, or combinations thereof. As such, one or more users can monitor a single well or multiple wells simultaneously. The system can allow a plurality of wells to be monitored simultaneously by a single user or by a plurality of users.

One or more of the gas detection data storages can include gas detection computer instructions to log the calibrated data simultaneously into one or more time based files and one or more depth based files. The logging of the calibrated data can occur by using predefined limits stored in one or more of the gas detection data storages, as defined by an operator on the rig or a remote user in communication with one or more of the gas detection processors via the network.

One or more of the gas detection data storages can include gas detection computer instructions to capture the acquired data based on a time event and to instruct one or more of the gas detection processors to capture data periodically. For example, the gas detection computer instructions can instruct the gas detection processor to capture the acquired data once every second. The time period can be any unit of time.

One or more of the gas detection data storages can include gas detection computer instructions to instruct one or more of the gas detection processors to capture the acquired data based on a depth event. For example, the depth event can be when the wellbore is drilled to a certain depth, the drill bit is at a certain depth, or combinations thereof. The depth event can occur using any unit of length. For example, the depth event can occur every 1 foot of well depth.

One or more of the gas detection data storages can include gas detection computer instructions to capture the acquired data based on another event, such as a location of a gamma marker, data that shows maximum gas concentration, a number of pump strokes achieved, such as 100 strokes of a mud pump, a drill string weight limit, a variation of drill string amount, or combinations thereof.

One or more of the gas detection data storages can include gas detection computer instructions to scale the acquired data mathematically using a normalization model that divides or multiplies the acquired data by a certain value attributable to a given reservoir.

One or more of the gas detection data storages can include gas detection computer instructions to scale the calibrated data in the same manner as the acquired data.

One or more of the gas detection data storages can include gas detection computer instructions to form a geological-hydrocarbon log.

One or more of the gas detection data storages can include gas detection computer instructions to transmit the formed geological-hydrocarbon log to one or more users via one or more networks. The formed geological-hydrocarbon log can be transmitted simultaneously through two different formats. For example, the formed geological-hydrocarbon log can be transmitted simultaneously through two or more different protocol gateways simultaneously to provide secure data transmission while ensuring the recipient receives the information.

The gas detection processors can be configured to transmit the calibrated data from the gas detection and well logging device to a rig data storage for display to operators simultaneously to indicate the presence of a high value of gas and to trigger an alarm to operators to take precautions. As such, the system can enable quick evaluations of the calibrated data to modify drilling operations, to confirm locations of known hydrocarbon reserves, and to ascertain new locations of hydrocarbon reservoirs.

An operator dashboard can be formed using computer instructions installed in the gas detection data storages. The operator dashboard can display the well condition and the drilling conditions in real-time. The operator dashboard can display real-time information continuously.

The operator dashboard can allow the tracking of one or more drilling operations. The operator dashboard can display information related to the drilling operations. For example, the operator dashboard can display drill bit depth, wellbore depth, a time clock, a time to drilling transition, a chromatograph screen, time until the shift supervisor shows up on the rig floor, other operation data, or combinations thereof.

The operator dashboard can track drilling progress, any and all drilling data, and portions of data from any monitoring device, as well as any number of time, depth, or other events simultaneously. Events can include completion of a preset number of pump strokes.

The system can also include an executive dashboard that can be formed using computer instructions stored in a central server data storage, a client device data storage, or combinations thereof. The executive dashboard can track drilling progress for multiple wells simultaneously. The executive dashboard can have different streamed values than the operator dashboard.

In embodiments, a user can view both the executive dashboard and the operator dashboard simultaneously to make fast safety decisions during drilling to save the lives of operators and rough necks on the rig.

The gas detection data storages can also include gas detection computer instructions to log the calibrated data simultaneously while logging time based files into a real-time based file and a lag time based file. For example, the real-time based file can capture an array of numbers, including a time of day and date, the wellbore depth, units of total gas, and a chromatogram showing gas composition. The lag time based file can include a time of day offset by the amount of time the data takes to move from a bit to a monitoring device at the surface, units of total gas, and a chromatogram showing gas composition.

The system can be used with multiple client devices located at various places, such as on a drilling rig, at a home office, at any other location, or combinations thereof.

The gas detection processors can communicate with the one or more client devices via the one or more networks.

The client devices can communicate with the one or more networks directly, through an auxiliary server, such as the central server, or combinations thereof.

The system can also include an encryption module that can be configured to encrypt all data transmissions. The encryption can prevent unauthorized viewing of data tracked, transmitted, or stored by the system.

The client devices can include client device processors. In addition, the client device processors can be in communication with one or more client device data storages. The client device data storages can be internal to the client device, external to the client device, or both.

One or more of the client device data storages can include client device computer instructions. The client device computer instructions can configure the client devices to query the formed geological hydrocarbon log, the acquired data, the calibrated data, the time based files, the depth based files, or combinations thereof in order to obtain real-time streaming data.

One or more of the client device data storages can include client device computer instructions to form and transmit a query to one or more of the gas detection processors. The query can be a keyword search, a Boolean search, performance of a mathematical function, a request for acquired data, a request for calibrated data, or combinations thereof. An example of a mathematical function that can be a query to the gas detection processors can be "predict the time to surface for a particular sample being lagged up the wellbore hole". Performance of the mathematical function can be accomplished by clicking a link, typing in a word or code, or combinations thereof. An example, of a keyword query can be to type in "Well located at Eagle point oil field", and the gas detection processors can search one or more of the gas detection data storages and return data related to the keyword query.

An example of another query that a user can ask one or more of the gas detection processors from one or more of the client devices can be "Provide a chromatogram of a gas sample from the wellbore to ascertain the methane, ethane, propane, isobutane, and normal butane content of the sample (C-1 through C-4), determine the value through integration of the area under the curve of the chromatogram of the individual components, and plot the individual curves on a single track of a surface log."

One or more of the client device data storages can include client device computer instructions to instruct the client device to instantly display the real-time streaming data.

One or more of the client device data storages can include client device computer instructions to instruct the client device to activate an alarm when the acquired data, the calibrated data, or combinations thereof rises above or falls below a preset limit. In addition, the gas detection data storages can include computer instructions to instruct the gas detection processors to activate an alarm when the acquired data, the calibrated data, or combinations thereof rises above or falls below a preset limit.

The alarm can be a visual alarm, an audio alarm, or combinations thereof. For example, the alarm can be an alert appearing on one or more displays in communication with one or more gas detection processors, one or more displays in communication with one or more client device processors, an activation of a ring tone of one or more client devices, an activation of an audio alarm in communication with the gas detection processor, or combinations thereof. The alarm can also include activation of a light by one or more of the gas detection processors, or activation of another device on the rig or adjacent to the wellbore that emits a light, sound, or both. The alarm can also include an email, an instant message, a text message, or combinations thereof transmitted to one or more users.

One or more of the client device data storages, one or more of the gas detection data storages, or combinations thereof can have computer instructions to instruct the associated processor to allow an operator, an executive, a geologist studying the streaming data, or combinations thereof to insert a commentary in real-time as part of the formed geological-hydrocarbon log for a particular depth. An example of a commentary can be a "location of a formation" or "an event that occurred on the rig related to drilling operations". Another commentary can be a remark about a zone of interest or other geological formation, such as a salt dome, a water reservoir, or a change in formation.

The gas detection processor can communicate bi-directionally or uni-directionally with a rig server. The rig server can have a rig processor and a rig data storage.

The rig data storage can be one or more flash drives, internal hard drives, external hard drives, virtual hard drives, floppy disk drives, optical disk drives, other computer readable medium storage devices, or combinations thereof.

The rig server can contain rig server computer instructions to collect rig data, such as rate of rotation of the drill bit, type of drill bit, temperature of gases and liquids exiting the wellbore, pressures of gases in the wellbore, measured depth of the wellbore, measured depth of the bit, the rate of penetration of the wellbore, pressure of fluid in the wellbore, other drilling operation data derived from on-rig sensors, or combinations thereof.

The rig server can have rig server computer instructions in the rig data storage to calibrate the rig data to preset limits and known sample values. Known sample values can be a rig sensor response in milliamps, such as 14 mA, to a known pressure, such as 2,500 psi. The rig server can have rig server computer instructions in the rig data storage to form a correlation to the sensor response to different pressures.

The rig server computer instructions can enable the transmission of data from the rig to the gas detection and well logging device, such as by a cellular network, a fiber optic network, a wired network, such as a Cat5e, the Internet, a wireless network, such as WI-FI™, a wired network, a satellite network, other communication networks, or combinations thereof.

The gas detection processors can be configured to transmit the acquired data, the calibrated data, or combinations thereof to the rig server, to the central server, to the client devices, or combinations thereof using real-time streaming.

The central server can be a server located at a service providers location that provides the rig data as a third party service to the owner of the rig, the owner of the well site, the environmental protection agency, other associated governmental authorities responsible for the safety of the rig, or combinations thereof. The central server can connect to the gas detection processor over the Internet.

In embodiments having a service provider or a central server used with the streaming data, an administrator can create an individual job number for the rig. For example, the job number can be an invoice number. Specific customer information, well information, and other information that can be associated with the job number. Illustrative other information can include the county, state, country, longitude and latitude, ground level elevation, Kelly Bushing elevation, or combinations thereof.

The central server can have a type template for the geological-hydrocarbon log. For example, the type template can be a vertical hole template or a horizontal template. The type template can allow a replay of digital data on a graphic. For example, the data concerning the wellbore and the formations can be streamed into the central server, which can form a graphic that can be a log, and can post the log for access by a customer.

Furthermore, the central server can be configured to provide other data and information to the users of the system, including pictures of samples; log ASCII standard (LAS) files; reports, such as morning reports; multiple scale logs, such as 5 inch logs or 2 inch measured depth logs; predetermined graphic image files; true vertical depth logs; engineering logs; horizontal logs; American Petroleum Institute (API) wellbore numbers; geologist names; titles; companies; field names; locations associated with a well; 10 foot drill time reports; the like; or combinations thereof.

The central server can also be configured to provide a logger name, logger phone number on location, on site location, a start up date, a start depth, or combinations thereof.

Turning now to the Figures, FIG. 1 depicts a schematic showing a system for creating a log during gas detection and monitoring according to one or more embodiments.

The system 100 can include one or more gas detection and well logging devices 2. The gas detection and well logging device 2 can be used to sense and transmit acquired data. The system 100 can be connected to or otherwise in communication with drilling equipment 110, one or more wellbores 112, or combinations thereof.

Figure 2B:
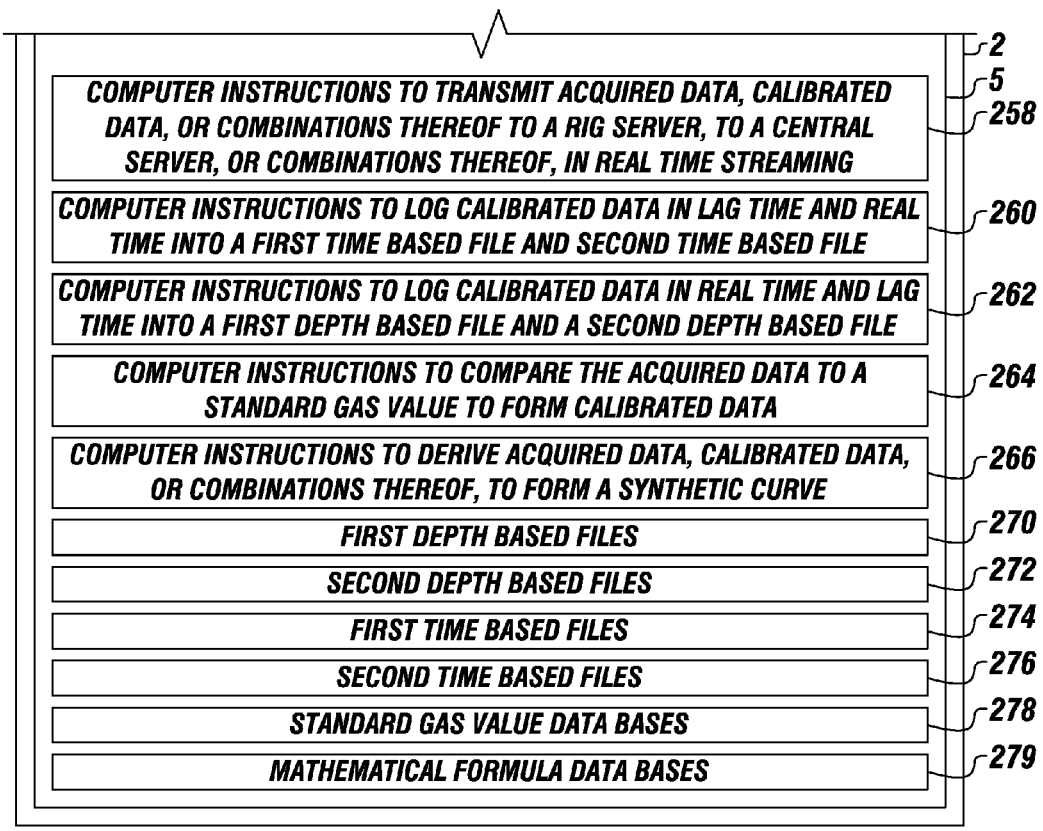

The gas detection and well logging device 2 can include a gas detection processor and a gas detection data storage in communication with the gas detection processor, as described in more detail in FIGS. 2A and 2B.

The monitoring devices 4a and 4b can be configured to monitor, acquire, and transmit data associated with at least one property of a drilling operation. The monitoring devices 4a and 4b can be devices that are commercially available. Illustrative monitoring devices can include a chromatography device or sensor, a temperature gauge, a temperature sensor, a thermocouple, a shear gauge, a strain gauge, an accelerometer, a flow meter, a pressure sensor, another device, or combinations thereof.

The gas detection and well logging device 2 can be in communication with the monitoring devices 4a and 4b. The gas detection and well logging device 2 can be configured, by computer instructions, to receive acquired data from the monitoring device, calibrate the acquired data, log the calibrated acquired data into a time based file and a depth based file, capture sensed data based on a time event, depth event, another event, or combinations thereof; scale the acquired data, the calibrated data, or combinations thereof; form a geological-hydrocarbon log, transmit the formed geological-hydrocarbon log, or combinations thereof. The gas detection and well logging device 2 is described in more detail in FIGS. 2A and 2B.

Communication can occur via any telemetry. For example, the communication between the monitoring devices 4a and 4b and the gas detection and well logging device 2 can be wireless telemetry, wired telemetry, or combinations thereof.

The network 14 can be in communication with the gas detection and well logging device 2. The network 14 can be any communication network.

The client device 30 can be in communication with the network 14, the gas detection and well logging device 2, a rig server 78, a central server 130, or combinations thereof. The client device 30 can be a smart phone, a laptop, a personal computer, other communication device, or combinations thereof. The client device 30 is described in more detail in FIG. 3.

The rig server 78 can be in communication with the network 14, the client device 30, the gas detection and well logging device 2, the central server 130, or combinations thereof. The rig server 78 is described in more detail in FIG. 9.

The central server 130 can be in communication with the rig server 78, the gas detection and well logging device 2, the client device 30, or combinations thereof through the network 14, another network, or combinations thereof. The central server 130 is described in more detail in FIG. 10.

FIGS. 2A-2B depict a schematic of a gas detection and well logging device 2, which can also be referred to as the well logging device, according to one or more embodiments.

The gas detection and well logging device 2 can include a gas detection data storage 5 and a gas detection processor 3.

The gas detection data storage 5 can include computer instructions to: receive acquired data from the monitoring devices 210, calibrate the acquired data 212, log calibrated data into a time based file and a depth based file 214; capture sensed data based on a time event, depth event, another event, or combinations thereof 216; scale the acquired data, calibrated data, or combinations thereof 218; form a geological-hydrocarbon log 220; and transmit the formed geological-hydrocarbon log 222.

The gas detection data storage 5 can also include computer instructions to: activate an alarm when the sensed data, calibrated data or combinations thereof rises above or falls below a preset limit 242; activate a client device alarm when the sensed data, calibrated data, or combinations thereof rises above or falls below a present limit 244; determine a number of lag strokes required to displace a preselected volume of a wellbore 246; insert a commentary in real time as part of the formed geological-hydrocarbon log for a particular depth 248; form an operator dashboard to track drilling progress, any data from any monitoring device, and events simultaneously 250; form an executive dashboard and track drilling progress for multiple wells simultaneously using the executive dashboard 256; transmit acquired data, calibrated data, or combinations thereof to a rig server, to a central server, or combinations thereof, in real time streaming 258; log calibrated data in lag time and real time into a first time based file and second time based file 260; log calibrated data in real time and lag time into a first depth based file and a second depth based file 262; compare the acquired data to a standard gas value to form calibrated data 264; and derive acquired data, calibrated data, or combinations thereof, to form a synthetic curve 266.

The computer instructions to receive acquired data from the monitoring devices 210 can configure the gas detection processor 3 such that it can communicate with one or more commercially available sensors, gauges, or other devices. For example, the computer instructions to receive acquired data from the monitoring devices 210 can be computer instructions provided by a manufacturer of the commercially available sensors, gauges, or other devices. In embodiments, the computer instructions to receive acquired data from the monitoring devices 210 can be configured to allow the gas detection processor to read the monitoring devices, communicate through a serial port with monitoring devices, to recognize one or more telemetry protocols associated with the monitoring devices, or combinations thereof.

The computer instructions to calibrate the acquired data 212 can configure the gas detection processor 3 to perform a function on signals sent from the monitoring devices that represents a data point. For example, a monitoring device can produce a first voltage for a first acquired value of a monitored property, a second voltage for a second acquired value of the monitored property, and the monitoring device can transmit the produced voltages to the gas detection processor 3. The gas detection processor 3 can convert the received voltages to the associated value using one or more mathematical functions or correlations. An example of the mathematical function can be multiplying the received voltage by a calibration constant determined using data acquired by one or more controlled measurements and adding an offset to represent a zero response.

The computer instructions to log calibrated data into a time based file, a depth based file, another event, or combinations thereof 214 can configure the gas detection processor 3 to log the data into identified databases or files on the gas detection data storage 5. For example, these computer instructions can instruct the gas detection processor 3 to append a row of data to a depth based file when a depth event occurs upon the achievement of a depth event. The depth event can be every time a foot of wellbore is drilled. These computer instructions can also instruct the gas detection processor 3 to append a row of data to a time based file when an interval lapses. The interval can be any time value.

The computer instructions to capture sensed data based on a time event, depth event, another event, or combinations thereof 216 can configure the gas detection processor 3 to perform a save or log operation upon the occurrence of a specific event. For example, the gas detection processor 3 can receive acquired gas readings and store the gas readings periodically using these computer instructions.

The computer instructions to scale the acquired data, calibrated data, or combinations thereof 218 can scale the calibrated data, acquired data, or combinations thereof. An example of scaling of drilling data, with a depth as the y-axis and a data value as the x-axis, can include changing a magnitude of the data value on the x-axis to match a scale to allow at least most of the data values to reside within the scaling for the entirety of the well log. For example, scaling can include fitting drilling data on a graph's x-axis by dividing each value by 100, making a graph that is scaled 0-to-100. Any value less than 100 on the scale will show up in the graph.

In one or more embodiments, if a data value exceeds the maximum point on the scale, the data value can appear on the scale with a visual indicator, indicating that the data value is equivalent to its position on the scale plus the maximum value of the scale. For example, if the maximum value on the scale is 100, and the data value is 112, the data value can appear as 12 on the scale with a visual indication that the data value has gone over-scale, thereby indicating that the data value is actually 112.

The computer instructions to form a geological-hydrocarbon log 220 can instruct the gas detection processor 3 to load the logged calibrated data from the time based files, the depth based files, other locations in the gas detection data storage 5, or combinations thereof, and use a stored template to plot and scale the data, and receive instructions from an operator allowing the operator to edit or provide additional information to the geological-hydrocarbon log as a comment, pattern, description, symbol, picture, text, graphic, or combinations thereof.

The computer instructions to transmit the formed geological-hydrocarbon log 222 can instruct the gas detection processor 3 to use one or more telemetry protocols to send the formed geological-hydrocarbon log to one or more client devices, central servers, or combinations thereof.

The computer instructions to activate an alarm when the sensed data, calibrated data or combinations thereof rises above or falls below a preset limit 242 can issue an alert upon acquired data, calibrated data, or combinations thereof reaching, passing, falling below, or combinations thereof a preset value. For example, these computer instructions can receive a specified lower limit of penetration of a wellbore in minutes per foot, such as 1 minute/foot, and can detect if the rate of penetration falls below the specified lower limit of penetration, such as 0.75 minute/foot. These computer instructions can activate an alarm apparatus to signal a change in rate of penetration below the specified lower limit. The change in rate of penetration can be due to a change in formation.

The computer instructions to activate a client device alarm when the sensed data, calibrated data, or combinations thereof rises above or falls below a present limit 244 can be used to send a signal to one or more client devices when a condition is exceeded, met, or dropped below. For example, a specified upper pump pressure can be entered into the system, such as a pump pressure of 10,000 psi, and can be stored into the system. Upon these limits being exceeded or met, the gas detection processor 3 can be instructed to send a signal to one or more client devices alerting them of this condition.

The computer instructions to determine a number of lag strokes required to displace a preselected volume of a wellbore 246 can instruct the gas detection processor 3 to collect information about the volume per stoke of the mud pumps, the inner diameters and lengths of the wellbore, the inner diameters, outer diameters, and lengths of components of the drill string, which can be entered by the operator. This information can be used by the computer instructions to determine a number of lag strokes required to displace a preselected volume of a wellbore 246, to calculate the internal volumes inside the drill string, sum the volumes to find a total internal drill string volume, calculate the annulus volume by calculating the volume between the outer diameter of the drill string and the inner diameter of the wellbore, calculate a total system volume by summing the annulus volume and internal drill string volume, and calculate the number of pump strokes required to circulate the entire surface volume through the wellbore. These computer instructions can then use the annulus volume to calculate the number of pump strokes required to circulate from the bottom of the wellbore to the surface to get theoretical lag strokes.

The gas detection processor 3 and or the gas detection data storage 5 can also include computer instructions to determine a transfer time from the top of the annulus to the monitoring device to provide transfer time. The transfer time and theoretical lag stroke can be used to calculate the current sample depth. In one or more embodiments, the actual number of lag strokes can be entered by the operator, and the transfer time and the actual lag strokes can be used to calculate the current sample depth.

The computer instructions to insert a commentary in real time as part of the formed geological-hydrocarbon log for a particular depth 248 can allow an operator to add text or other marks to the log.

The computer instructions to form an operator dashboard to track drilling progress, any data from any monitoring device, and events simultaneously 250 can instruct the gas detection processor 3 to plot the acquired data, calibrated data or both to display digital values of the acquired data, calibrated data, or both, a graphical representation of single data points; to highlight data points in color based on set parameters; to issue alarms based on set parameters, which can be issued based on calculations performed by the processor, the acquired data, the calibrated data, or combinations thereof; and to scale the plotted data.

The computer instructions to transmit acquired data, calibrated data, or combinations thereof to a rig server, to a central server, or combinations thereof, in real time streaming 258 can configure the gas detection processor 3 as disclosed herein.

The computer instructions to log calibrated data in lag time and real time into a first time based file and second time based file 260 can log the calibrated data in real time in a first time based file on the gas detection data storage 5, and the calibrated data in lag time in a second time based file on the gas detection data storage 5.

The computer instructions to log calibrated data in real time and lag time into a first depth based file and a second depth based file 262 can log the calibrated data in real time in a first depth based file on the gas detection data storage 5, and the calibrated data in lag time in a second depth based file on the gas detection data storage 5.

The computer instructions to compare the acquired data to a standard gas value to form calibrated data 264 can configure the gas detection processor 3 to perform a function on signals sent from the monitoring devices that represent a data point. For example, a monitoring device can produce a first voltage for a first sensed value of a monitored property, a second voltage for a second value of a monitored property; and the monitoring device can transmit the produced voltages to the gas detection processor 3. The gas detection processor 3 can convert the received voltages to the associated value using one or more mathematical functions or correlations. An example of the mathematical function can be multiplying the received voltage by a calibration constant determined using data acquired by one or more controlled measurements and adding an offset to represent a zero response.

The computer instructions to derive acquired data, calibrated data, or combinations thereof, to form a synthetic curve 266 can use data points to form a curve based on one or more mathematical formulas. For example, this can be used to identify one or more trends or correlations between the data points. The trends can be used to determine if natural gas, oil, or both is likely to be found at a location within the wellbore. In embodiments, the trend can indicate the pressure changes at the bottom of the wellbore.

The gas detection data storage 5 can also include one or more first depth based files 270, one or more second depth based files 272, one or more first time based files 274, one or more second time based files 276, one or more standard gas value data bases 278, one or more mathematical formula data bases 279, the like, or combinations thereof.

The first depth based file 270 can receive and store depth based data in real time, such as depth based calibrated data. The second depth based file 272 can receive and store depth based data that is received in lag time.

The first time based file 274 can receive and store time based data in real time, such as time based calibrated data. The second time based file 276 can receive and store time based data in lag time, such as time based calibrated data.

The standard gas value data bases 278 can contain one or more gas values obtained from a specialty gas supplier, which can be certified within a tolerance.

The mathematical formula data base 279 can contain one or more mathematical formulas for calibrating acquired data and signals from one or more monitoring devices. The mathematical formula data base 279 can also include formulas for forming synthetic curves, calculating lag time, and determining other values required by the computer instructions. One or more of the above mentioned computer instructions in the gas detection data storage 5 can be linked to the mathematical formula data base 279. In embodiments, one or more of the computer instructions in the gas detection data storage 5 can have associated mathematical formulas integrated therewith.

Figure 3:
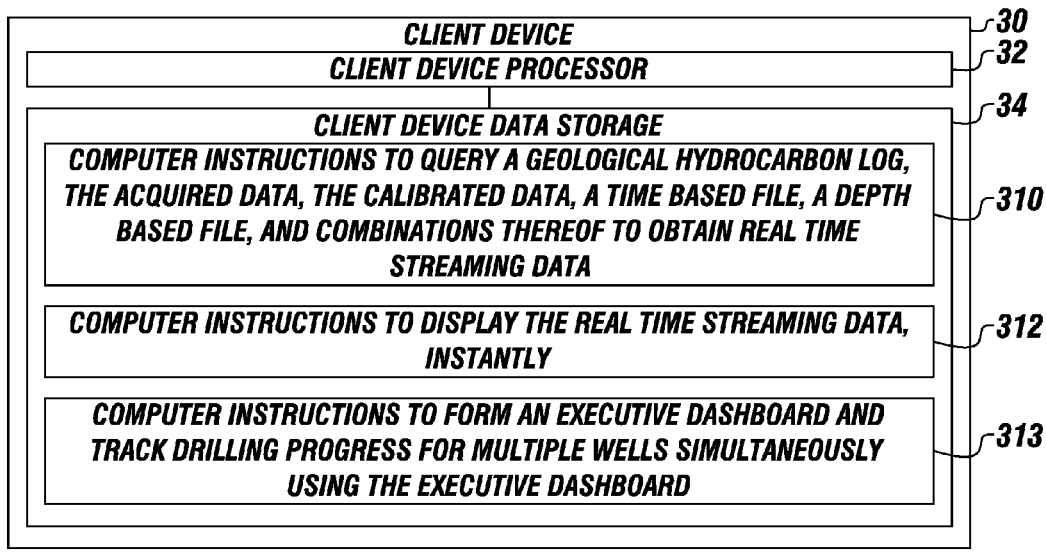
FIG. 3 is a schematic of a client device according to one or more embodiments.

FIG. 3 is a schematic of the client device 30 according to one or more embodiments. The client device 30 can include a client device data storage 34 in communication with a client device processor 32.

The client device data storage 34 can include computer instructions to query a geological hydrocarbon log, the acquired data, the calibrated data, a time based file, a depth based file, and combinations thereof to obtain real time streaming data 310; and display the real time streaming data, instantly 312.

The computer instructions to query a geological hydrocarbon log, the acquired data, the calibrated data, a time based file, a depth based file, and combinations thereof to obtain real time streaming data 310 can instruct the client device processor 32 to communicate with the central server and enter one or more searches. The searches can be a data base query or a file base look up, and the queried information can be displayed using an executive dashboard.

The computer instructions to display the real time streaming data, instantly 312 can instruct the client device processor 32 to integrate received data from the central server in an executive dash board.

The client device data storage 34 can include computer instructions to form an executive dashboard and track drilling progress for multiple wells simultaneously using the executive dashboard 313 can instruct the client device processor 32 to display digital data, plot data, initiate alarms, scroll through the data and configure what digital points and graphs are displayed, export digital files that represent data points of interest, display information about the last updated data and time from the central server, and display a current view the data and time.

Figure 4:
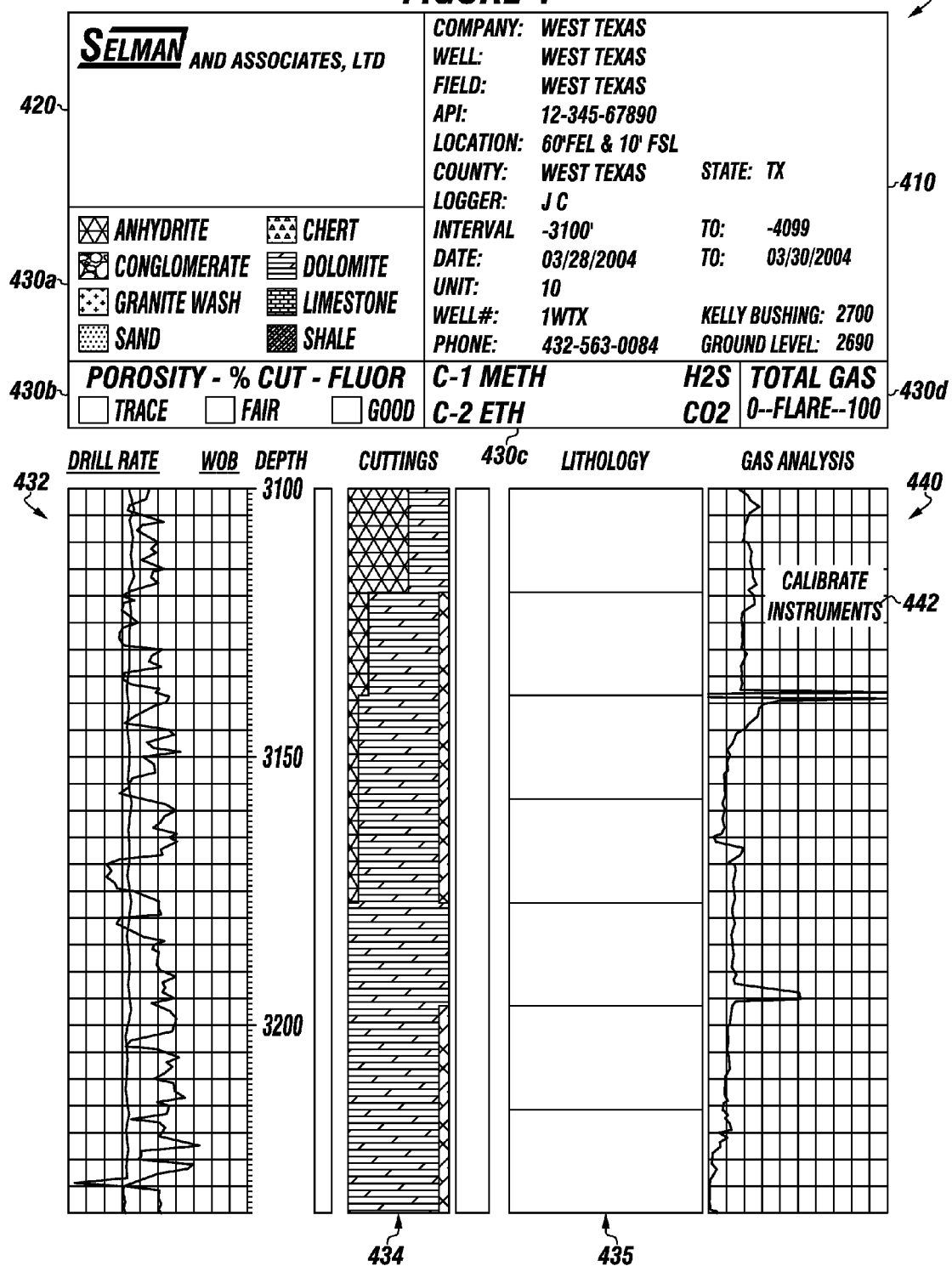
FIG. 4 is a segment of a geological-hydrocarbon log according to one or more embodiments.

FIG. 4 is a segment of a geological-hydrocarbon log 400 according to one or more embodiments. The geological-hydrocarbon log 400 can include a header section 410, an identification of service provider section 420, one or more legend sections (four are shown 430a, 430b, 430c, and 430d; a real time drilling data section 432, a geological sample analysis section 434, a lithology description section 435, and a gas analysis lag time section 440.

The header section 410 can include information that identifies the owner of the associated well, where the associated well is located, who performed the geological-hydrocarbon log, the phone number for the person performing the geological-hydrocarbon log, the date the geological-hydrocarbon log was performed, and other identifying information.

The identification of service provider section 420 can include a logo or header identifying the company producing the geological-hydrocarbon log.

The legend sections 430a-430d can indicate cross hatching, colors, or combinations thereof allowing identification of the information presented in the real time drilling data section 432, geological sample analysis section 434, gas analysis lag time section 440, lithology description section 435, or combinations thereof.

The real time drilling data section 432 can have graphical representations of acquired data, calibrated data, or combinations thereof in real time. The drilling data can include drill rate, weight on bit, and depth. Other drilling data can be represented in this section.

The geological sample analysis section 434 can show a cross section of the wellbore and describe the different geological conditions of the wellbore. For example, the cuttings section can identify if the wellbore has shale, granite wash, coal, granite, salt, siltstone, limestone, dolomite, chert, anhydrite, conglomerate, sand, other geological conditions, or combinations thereof.

The lithology description section 435 can include written descriptions of the wellbore at different depths. The gas analysis lag time section 440 can graphically represent lag time data of acquired data, calibrated data, or combinations thereof.

The gas analysis lag time section 440 can include data related to the composition of detected gases at different depths of the wellbore. The gas analysis lag time section 440 can also include other lag time data relating to other drilling operation properties.

Comments 442 can be entered into the gas analysis lag time section 440 to indicate important events occurring during the acquisition of the displayed data. The comments 442 can also be entered on other locations of the geological-hydrocarbon log 400. Illustrative comments can include: "location of a formation" or "an event that occurred on the rig related to drilling operations". Another comment can be a remark about a zone of interest or other geological formation, such as salt dome, a water reservoir, or a change in formation.

Figure 5:
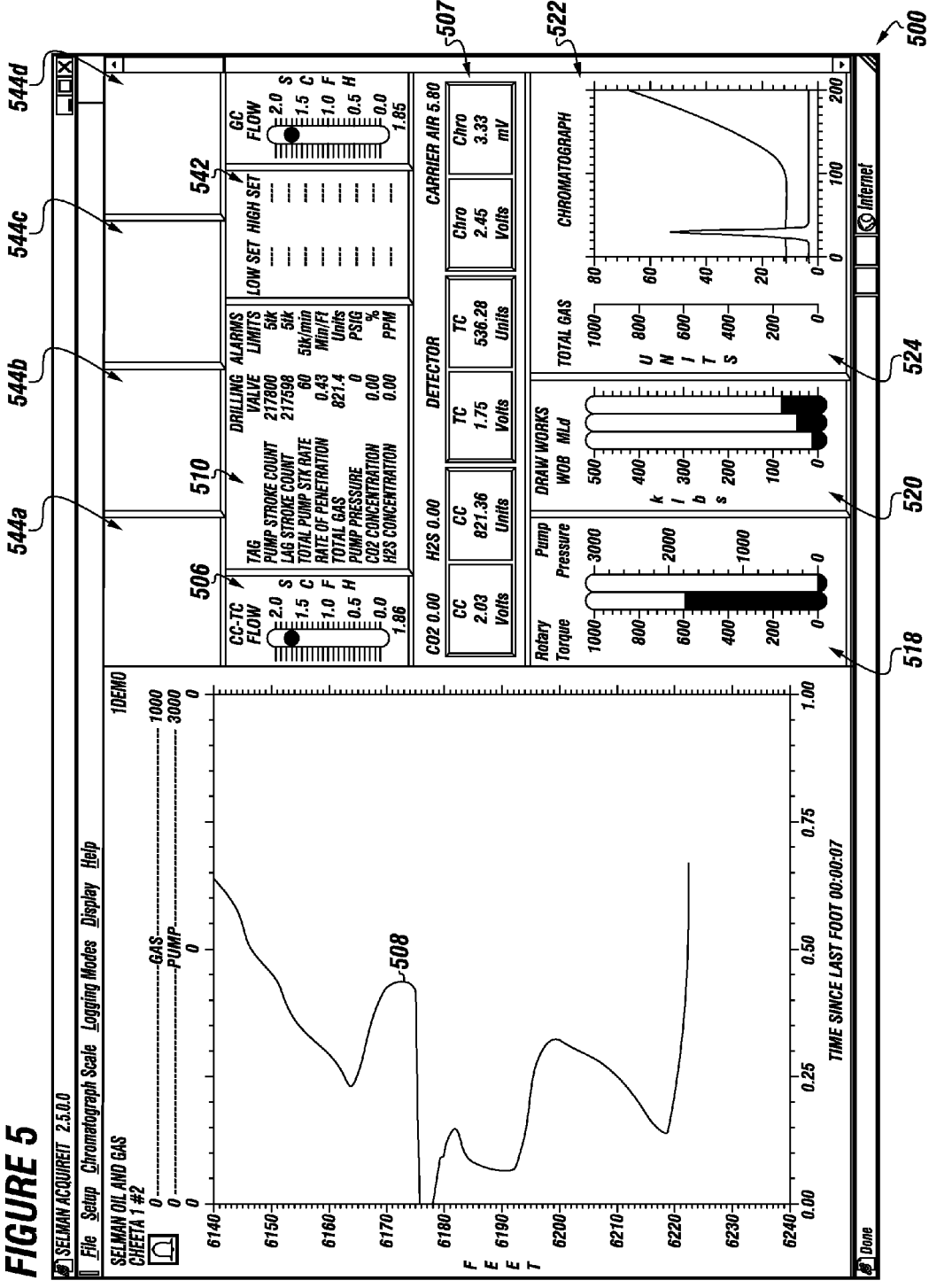
FIG. 5 is a segment of an operator dashboard according to one or more embodiments.

FIG. 5 is a segment of an operator dashboard 500 according to one or more embodiments. The operator dashboard 500 can include a graphical representation of calibrated data 508, a representation of calibrated data related to flow rates 506, an acquired data section 507, a calibrated pump data section 518, a calibrated draw works section 520, a graphical representation of acquired chromatograph data 522, an alarm set section 542, and a calibrated chromatograph data section 524. The calibrated chromatograph data section 524 can display important voltage parameters for a chromatograph monitoring device acquiring the data.

The operator dashboard 500 can also include operator data track sections 544a, 544b, 544c, and 544d. The operator data track sections 544a-544d can display calibrated data associated with one or more drilling operations. For example, the operator data track sections 544a-544d can display hydrocarbon data, depth data, or other data.

The alarm set section 542 can include a section for an operator to input or select alarm criteria. For example, the operator can set a low value alarm point, a high value alarm point, or both. As such, if drilling data, such as calibrated drilling data represented in a representation of calibrated drilling data section 510, reaches one of the alarm points, an alarm can be issued.

Figure 6:
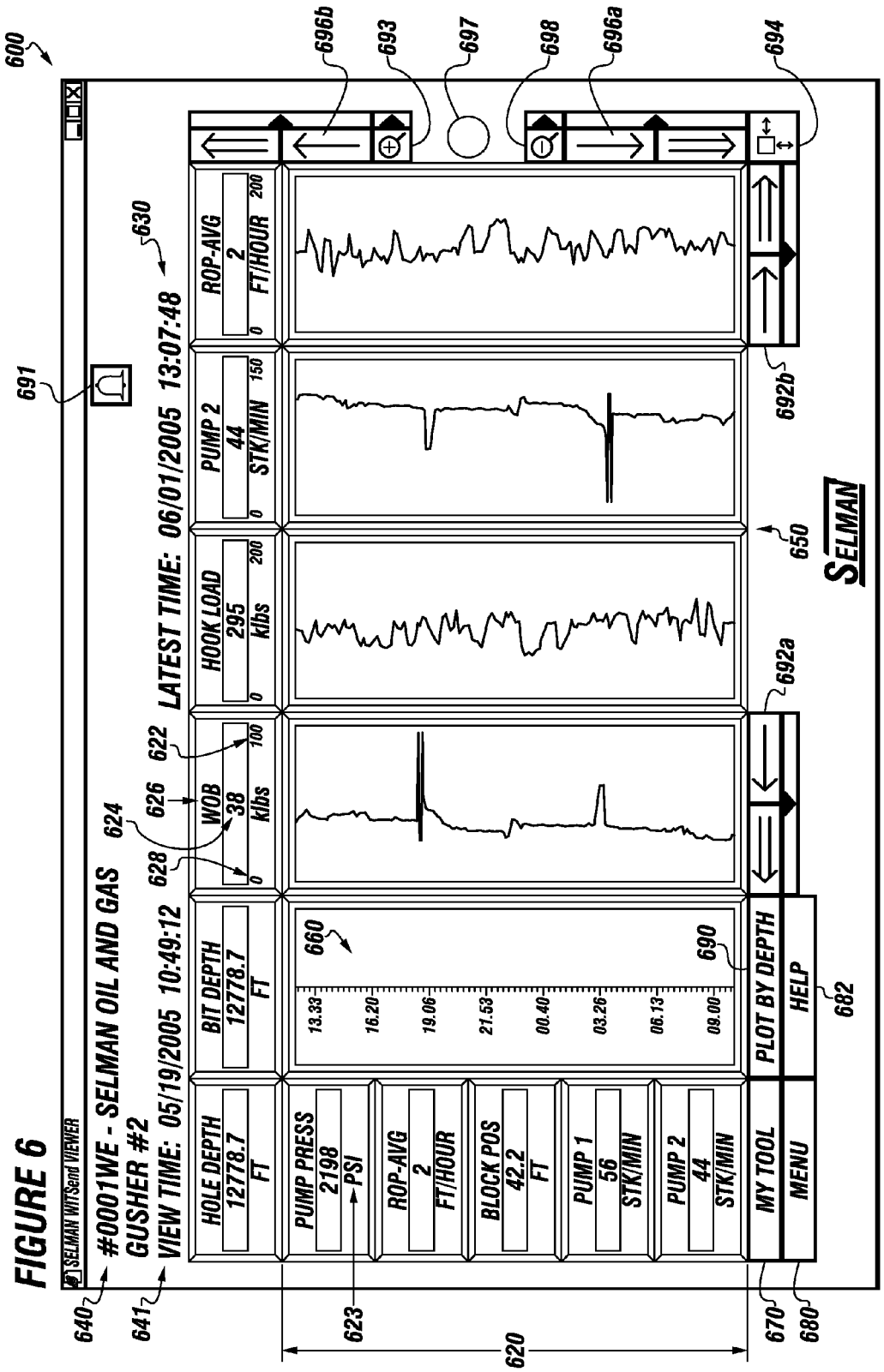
FIG. 6 depicts an executive dashboard according to one or more embodiments.

FIG. 6 depicts an executive dashboard 600 according to one or more embodiments. The executive dashboard 600 can include a plurality of digital data track displays 620. The plurality of digital data track displays 620 can display data associated with drilling operations. For example the plurality of digital data track displays 620 can display weight on bit data, bit depth, hole depth, pump pressure, block pressure, pump stroke data, hook load, and the like. The plurality of digital data track displays 620 can have an upper scale bound section 622, a lower scale bound section 628, a unit section 623, a digital display of the latest data value 624, and an identifier for the data being tracked 626.

The executive dashboard 600 can also include a section for indicating a time stamp 630 for the last time data was downloaded from the central server, and an identifier number section 640. The identifier number section 640 can include an invoice number.

The executive dashboard 600 can also have a current view time section 641, which can indicate a time stamp for the current value being displayed by the graphical data track sections 650.

The executive dashboard 600 can also include a time vs depth value graph 660. A my tool button section 670 can be displayed on the executive dashboard 600. The my tool button section 670 can be used to execute an action of a tool that can be picked while configuring the view using a menu button 680.

The menu button 680 can be displayed on the executive dashboard 600, and can be used to open up choices allowing the user to configure the display. In addition, a help button 682 can be displayed and used to retrieve instructions or guidance on operating the executive dashboard 600.

The executive dashboard 600 can have a switch index mode button 690, which can allow the user to switch between plotting by a time index and a depth index.

The user can scroll data tracks using a scroll left button 692a, a scroll right button 692b, a scroll down button 696a, and a scroll up button 696b. The layout of the data tracks can be adjusted by a user using the layout data tracks button 694. The layout data tracks button 694 can allow control of the size, number, and type of data tracks on the screen.

The executive dashboard 600 can be configured to allow the user to increase the magnification using the zoom in button 693, and to decrease the magnification using the zoom out button 698.

The executive dashboard 600 can also include a status indicator 697 that can change colors to indicate one or more status of the drilling operation, and can also provide a visual indication that data is being received. For example, the status indicator 697 can display a green color if on bottom and a red color if off bottom.

The executive dashboard 600 can also be used to turn an alarm on and off. The executive dashboard 600 can have an alarm indicator 691 that can change color to indicate if the alarm is on or off. The alarm indicator 691 can be clicked to turn off the alarm or turn on the alarm.

Figure 7:
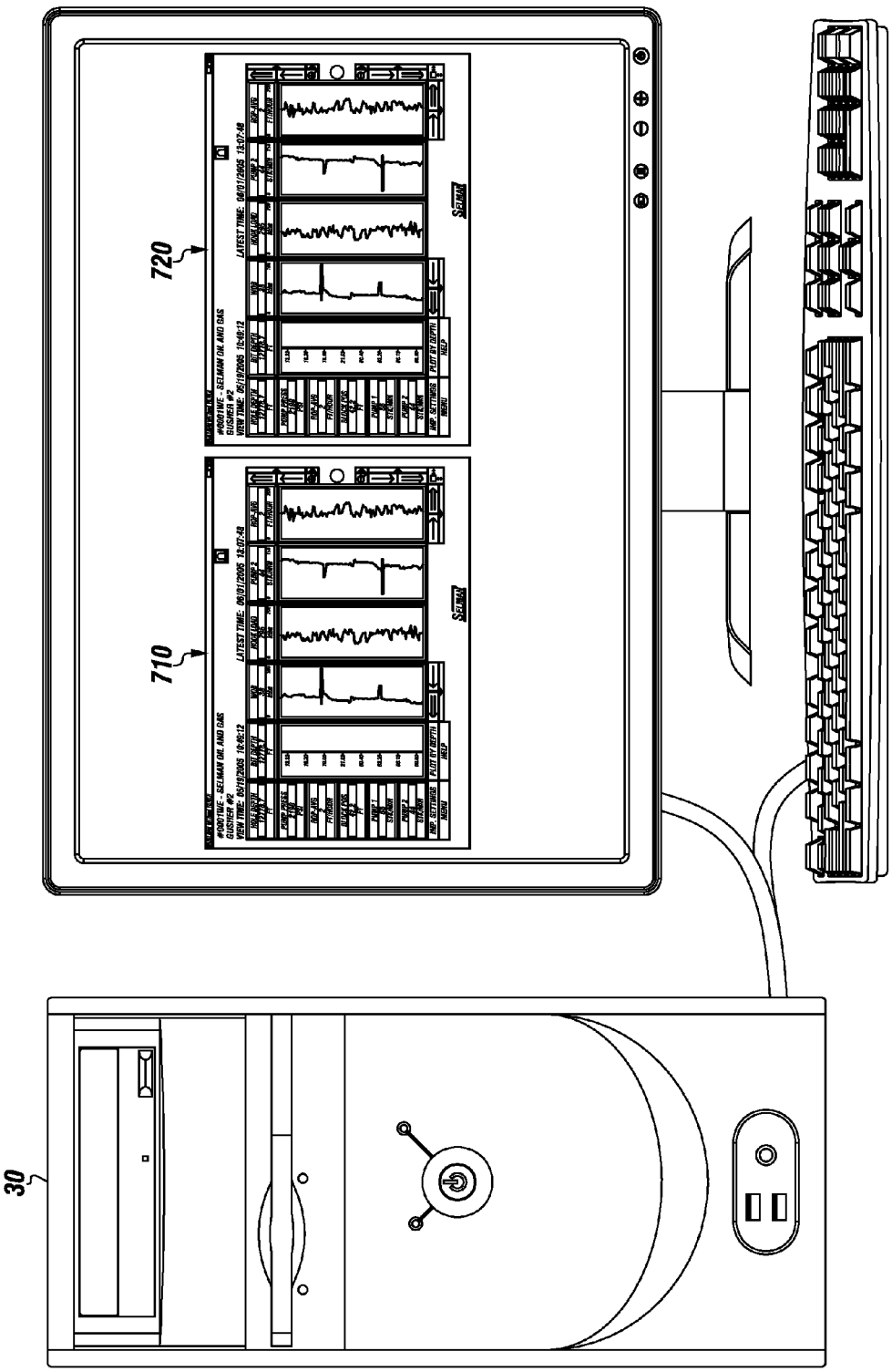
FIG. 7 depicts a client device simultaneously monitoring two wells according to one or more embodiments.

FIG. 7 depicts the client device 30 monitoring two wells simultaneously according to one or more embodiments. A first executive dashboard 710 can be associated with a first wellbore, and a second executive dashboard 720 can be associated with a second wellbore. The two executive dashboards 710 and 720 can be viewed simultaneously allowing the user to monitor two wells simultaneously. The executive dashboards 710 and 720 can be substantially similar to the executive dashboard depicted in FIG. 5 and in FIG. 6.

FIG. 8 displays the client device 30 displaying live stream data according to one or more embodiments. The client device 30 can display acquired data, calibrated data, or combinations thereof for one or more drilling operations in real time. The data can be displayed using a plurality of digital data displays 810. Each of the plurality of digital data displays 810 can include a current data display area 812, a units section 830, and a name section 820. The name section 820 can identify the property being displayed. The client device 30 can also display a wellbore identification number 850 to identify the wellbore being monitored.

FIG. 9 depicts a rig server 78 according to one or more embodiments. The rig server 78 can include a rig server processor 80 in communication with a rig server data storage 910.

The rig server data storage 910 can include computer instructions to collect rig data 986. The rig server data storage 910 can also include computer instructions to calibrate rig data 990, and computer instructions to transmit the rig data to the gas detection devices 992. The rig server 78 can be a commercially available rig server.

FIG. 10 depicts the central server 130 according to one or more embodiments. The central server 130 can include a central server processor 131 in communication with a central server data storage 1030.

The central server data storage 1030 can include computer instructions for forming a type template for the wellbore 1096, and computer instructions for providing well information to users of the system 1098. The well information can be one or more details for a well. The details can include one or more of the following: pictures of the samples, log ASCII standard (LAS) files, reports, such as morning reports, multiple scale logs, such as 5 inch logs or 2 inch measured depth logs, predetermined graphic image files, true vertical depth logs, engineering logs, horizontal logs, American Petroleum Institute (API) wellbore numbers, geologist names, titles, companies, field names, locations associated with a well, 10 foot drill time reports, or combinations thereof.

The central server data storage 1030 can also have computer instructions for configuring the client device, the gas detection processor, the rig server, or combinations thereof 1099. The central server data storage 1030 can have computer instructions to configure the central server to transmit the computer instructions for configuring the client device, the gas detection processor, the rig server, or combinations thereof to the respective device 1097.

The central server data storage 1030 can also have computer instructions to form an executive dashboard and track drilling progress for multiple wells simultaneously using the executive dashboard 1056, which can instruct the central server processor 131 to display digital data, plot data, initiate alarms, scroll through the data and configure what digital points and graphs are displayed, export digital files that represent data points of interest, display information about the data and time of the latest updated data by the central server, and display a current view data and time.

While these embodiments have been described with emphasis on the embodiments, it should be understood that within the scope of the appended claims, the embodiments might be practiced other than as specifically described herein.

What is claimed is:

1. A system for creating a geological hydrocarbon drilling log during gas detection and monitoring of a drilling operation using data acquired by monitoring devices on a drilling rig, on drilling equipment near the drilling rig, or in a wellbore being drilled for viewing on at least one client device, wherein the geological hydrocarbon drilling log contains real time streaming of sensed data and acquired data from fluid analysis, wherein the system comprises:

a. a rig server with a rig processor in communication with a rig server data storage connected to a network and to the monitoring devices positioned on the drilling rig, the drilling equipment, the wellbore being drilled, a mudpit, or combinations thereof to monitor and acquire data related to gas detection, fluid status, emissions from the wellbore, and other wellbore data using a member of the group consisting of: gas sensors, depth sensors, flame ionization detectors, catalytic combustion detectors, thermal conductivity detectors, infrared gas detectors, other gas detection devices, and chromatographs, and having computer instructions in the rig server data storage to collect sensed rig data including a member of the group consisting of: temperature, pressure, depth of equipment, and chemical content of drilling fluids, to calibrate collected rig data against known parameters and known chemical content for drilling fluids, and to transmit the calibrated rig data via the network;

b. a central server with a central server processor and a central server data storage connected to the network, wherein the central server data storage contains:

(i) computer instructions to form an executive dashboard, wherein the executive dashboard comprises:

1. a plurality of digital data track displays displaying digital data associated with drilling operations consisting of at least depth and time;

2. a unit section within a digital data track display;

3. a digital display of a latest data value;

4. an identifier for digital data being tracked;

5. a time versus depth value graph;
6. a switch index mode selection allowing a user to switch between plotting by a time index and plotting by a depth index;
7. a layout of data tracks button connected to computer instructions to control size, number and type of data tracks on the executive dashboard;
8. a status indicator that can change colors to indicate one or more status of the drilling operation and provide a visual indication that digital data is being received from the monitoring devices; and
(ii) computer instructions to transmit the executive dashboard to the at least one client device via the network; and
c. a gas detection well logging device having a gas detection processor and a gas detection data storage, wherein the gas detection well logging device is connected to the network for sensing and transmitting acquired data from the monitoring devices positioned on the drilling rig, the drilling equipment, the wellbore being drilled, the mud-pit, or combinations thereof, wherein the gas detection data storage contains:
(i) computer instructions to receive data from the monitoring devices;
(ii) computer instructions to calibrate the data from the monitoring devices;
(iii) computer instructions to log the calibrated data into a time based file and a depth based file;
(iv) computer instructions to capture the acquired data based on a time event;
(v) computer instructions to capture the acquired data based on a depth event,
(vi) computer instructions to form an operator dashboard to display well conditions, drilling conditions and drilling operations in real time continuously using data from the monitoring devices, wherein the operator dashboard comprises: a drill bit depth, a wellbore depth, a time clock, a time to drilling transition, and a chromatograph screen, and wherein the operator dashboard tracks a member of the group consisting of: drilling progress, all drilling data, portions of data from any monitoring device, a number of time, depth or other events simultaneously;
(vii) computer instructions to scale acquired data, calibrated data, or combinations thereof;
(viii) computer instructions to form a geological-hydrocarbon drilling log and to log calibrated data in real time and lag time into a first depth based file and into a second depth based file; and
(ix) computer instructions to transmit acquired data, calibrated data, the formed geological-hydrocarbon drilling log or combinations thereof, to the rig server, to the central server, or combinations thereof using real time streaming; and
d. the at least one client device in communication with the network with a client device processor and a client device data storage, wherein the client device data storage comprises: computer instructions for querying the formed geological-hydrocarbon drilling log for the sensed data, the calibrated data, the time based file, the depth based file, or combinations thereof, to obtain real time streaming data; and computer instructions for instantly displaying the real time streaming data, and wherein the system allows for simultaneous localized monitoring and remote monitoring over the network using the at least one client device, wherein the system allows the user to view both the executive dashboard and the operator dashboard simultaneously.

2. The system of claim 1, further comprising computer instructions in the gas detection data storage to activate an alarm when the sensed data, the calibrated data, or combinations thereof are above or below a preset limit.

3. The system of claim 1, further comprising computer instructions in the client device data storage to activate a client device alarm when the sensed data, the calibrated data, or combinations thereof are above or below a present limit.

4. The system of claim 1, further comprising computer instructions in the gas detection data storage to determine a number of lag strokes required to displace a preselected volume of a wellbore.

5. The system of claim 1, further comprising computer instructions in the gas detection data storage for inserting a commentary in real time as part of the formed geological-hydrocarbon drilling log for a particular depth.

6. The system of claim 1, wherein the computer instructions in the gas detection data to form the operator dashboard track drilling progress, track data from the monitoring devices, and track events simultaneously.

7. The system of claim 6, further comprising computer instructions in the client device data storage to track the drilling progress for multiple wells simultaneously using the executive dashboard.

8. The system of claim 1, further comprising computer instructions in the gas detection data storage to form a synthetic curve.

* * * * *